United States Patent
Mathur et al.

(10) Patent No.: US 9,053,035 B1
(45) Date of Patent: Jun. 9, 2015

(54) MULTI-THREADED SYSTEM FOR PERFORMING ATOMIC BINARY TRANSLATIONS

(71) Applicants: Ashish Mathur, New Delhi (IN); Sandeep Jain, Ghaziabad (IN)

(72) Inventors: Ashish Mathur, New Delhi (IN); Sandeep Jain, Ghaziabad (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 89 days.

(21) Appl. No.: 14/088,446

(22) Filed: Nov. 25, 2013

(51) Int. Cl.
  *G06F 12/02* (2006.01)
  *G06F 12/08* (2006.01)

(52) U.S. Cl.
  CPC .......... *G06F 12/0875* (2013.01); *G06F 12/084* (2013.01); *G06F 2212/6042* (2013.01)

(58) Field of Classification Search
  CPC .............. G06F 12/0875; G06F 12/084; G06F 12/6042; G06F 9/526; G06F 9/3004; G06F 9/30043; G06F 9/30072; G06F 9/30087; G06F 9/3834
  See application file for complete search history.

(56) References Cited

U.S. PATENT DOCUMENTS

| | | | |
|---|---|---|---|
| 6,460,124 B1 * | 10/2002 | Kagi et al. | 711/163 |
| 7,257,814 B1 * | 8/2007 | Melvin et al. | 718/104 |
| 7,870,344 B2 | 1/2011 | Shavit | |
| 2003/0105943 A1 * | 6/2003 | Yeh et al. | 712/216 |
| 2003/0217115 A1 * | 11/2003 | Rowlands | 709/214 |
| 2005/0273782 A1 * | 12/2005 | Shpeisman et al. | 718/100 |
| 2005/0289549 A1 * | 12/2005 | Cierniak et al. | 718/102 |
| 2006/0161919 A1 * | 7/2006 | Onufryk et al. | 718/102 |
| 2008/0244453 A1 | 10/2008 | Cafer | |
| 2010/0332770 A1 * | 12/2010 | Dice et al. | 711/148 |
| 2014/0189260 A1 * | 7/2014 | Wang et al. | 711/152 |

OTHER PUBLICATIONS

Oscar Almer et al., "Scalable Multi-Core Simulation Using Parallel Dynamic Binary Translation", IEEE, 2011.

Jae Woong Chung et al., "Thread-Safe Dynamic Binary Translation using Transactional Memory", HPCA, 2008.

* cited by examiner

*Primary Examiner* — Hiep Nguyen

(74) *Attorney, Agent, or Firm* — Charles Bergere (57) ABSTRACT

A multi-threaded binary translation system performs atomic operations by a thread, such operations include processing a load linked instruction and a store conditional instruction. The store conditional instruction updates data stored in a shared memory address only when at least three conditions are satisfied. The conditions are: a copy of a load linked shared memory address of the load linked instruction is the same as the store conditional shared memory address, a reservation flag indicates that the thread has a valid reservation, and the copy of data stored by the load linked instruction is the same as data stored in the store conditional shared memory address.

20 Claims, 6 Drawing Sheets

MULTI-THREADED SYSTEM FOR PERFORMING ATOMIC BINARY TRANSLATIONS

BACKGROUND OF THE INVENTION

The present invention relates generally to multi-threaded software and, more particularly, to a system for performing an atomic operation by a thread in a multi-threaded binary translation system.

Binary translation is the simulation of one (target) Instruction Set Architecture (ISA) with another (host) ISA. The performing of binary translations (target simulations) can be optionally accompanied with optimization and code instrumentation in which the host and target ISA may be the same or different architectures.

When considering multi-core architectures, sequential target simulation is prohibitively slow, thereby motivating the use of parallel simulation in which multiple threads may be running target ISAs. In this regard the target hardware architecture provides hardware guaranteed atomic instructions for implementing synchronization primitives in a shared memory cache coherent multi-core environment or system. More specifically, when an atomic store instruction is performed on data stored in a shared memory address, any resulting modification to the data stored in the shared memory address appears to have occurred "instantaneously" to the rest of the multi-core system.

One challenge with the parallel simulation of atomic instructions relates to the complexity of parallel access to shared memory locations by multiple contending threads. As a result, blocking algorithms relying on mutual-exclusion (mutex) software primitives are often used for parallel simulation of atomic instructions. However, mutual exclusion software primitives have unnecessarily large performance overhead. As an alternative, non-blocking algorithms have been developed for parallel simulation of atomic instructions. Lock-free and wait free are types of non-blocking algorithms. Lock free algorithms allow for system wide progress, whereas wait-free algorithms ensure per-thread progress. Hence, wait-free non-blocking algorithms are preferable over lock-free, however wait free non-blocking algorithms typically have inherent race conditions and will not work correctly for multi-core target systems.

BRIEF DESCRIPTION OF THE DRAWINGS

The invention, together with objects and advantages thereof, may best be understood by reference to the following description of preferred embodiments together with the accompanying drawings in which.

DETAILED DESCRIPTION OF PREFERRED EMBODIMENTS

The detailed description set forth below in connection with the appended drawings is intended as a description of presently preferred embodiments of the invention, and is not intended to represent the only forms in which the present invention may be practised. It is to be understood that the same or equivalent functions may be accomplished by different embodiments that are intended to be encompassed within the spirit and scope of the invention. In the drawings, like numerals are used to indicate like elements throughout. Furthermore, terms "comprises," "comprising," or any other variation thereof, are intended to cover a non-exclusive inclusion, such that module, circuit, device components, structures and method steps that comprises a list of elements or steps does not include only those elements but may include other elements or steps not expressly listed or inherent to such module, circuit, device components or steps. An element or step proceeded by "comprises . . . a" does not, without more constraints, preclude the existence of additional identical elements or steps that comprises the element or step.

In one embodiment, the present invention provides a method for performing an atomic operation by a thread in a multi-thread binary translation system comprising a multi-core host processor. The method comprises processing a load linked instruction stored in a virtual memory address space for the thread, wherein load linked instruction identifies a load linked shared memory address that is an address of a memory location shared by other threads in the system. The processing of the load linked instruction includes storing a copy of the load linked shared memory address, storing a copy of data currently stored in the load linked shared memory address, and updating the status of a reservation flag to indicate that the thread has an atomic reservation. The method also comprises processing a store conditional instruction stored in the virtual memory address space for the thread, wherein the store conditional instruction identifies a store conditional shared memory address. The processing of the store conditional instruction includes updating data stored in the store conditional shared memory address with data generated by the thread, the updating being performed only when at least three conditions are satisfied. These conditions are: the copy of the load linked shared memory address is the same as the store conditional shared memory address, the reservation flag indicates that the thread has a valid reservation, and the copy of data is the same as data stored in the store conditional shared memory address.

In another embodiment, the present invention provides a multi-thread binary translation system comprising a multi-core host processor with a host memory. The processor in operation provides for concurrently controlling multi-threads wherein two or more of the threads concurrently perform the operations of processing a load linked instruction stored in a virtual memory address space for the thread. This load linked instruction identifies a load linked shared memory address that is an address of a memory location shared by other threads in the system. The processing of the load linked instruction includes storing a copy of the load linked shared memory address, storing a copy of data currently stored in the load linked shared memory address, and updating the status of a reservation flag to indicate that the thread has an atomic reservation. The method also comprises processing a store conditional instruction stored in the virtual memory address space for the thread, wherein the store conditional instruction identifies a store conditional shared memory address. The processing of the store conditional instruction includes updating data stored in the store conditional shared memory address with data generated by the thread, the updating being performed only when at least three conditions are satisfied. These conditions are: the copy of the load linked shared memory address is the same as the store conditional shared memory address, the reservation flag indicates that the thread has a valid reservation, and the copy of data is the same as data stored in the store conditional shared memory address.

Figure 1:
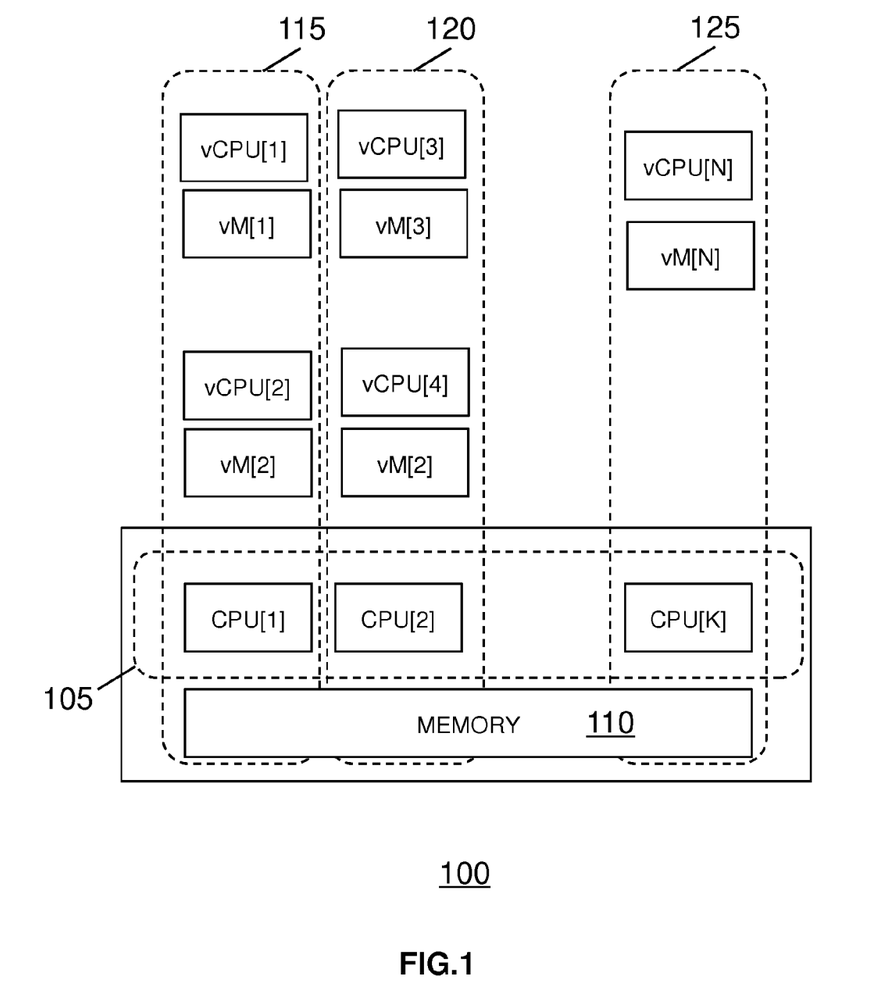
FIG. 1 is a schematic block diagram of a multi-thread binary translation system in accordance with an embodiment of the present invention.

Referring now to FIG. 1, a schematic block diagram of a multi-thread binary translation system 100 in accordance with an embodiment of the present invention is shown. The system 100 includes a multi-core host processor 105 comprising processors CPU[1] to CPU[k] and a common memory 110. The system 100 in operation provides for concurrently controlling threads 115, 120 and 125. Each of the threads 115,120,125 has at least one virtual processor vCPU[i] with an associated virtual memory address space vM[i] as will be apparent to a person skilled in the art. Furthermore, in the remainder of this specification threads and virtual processors vCPU[i] may be used interchangeably.

Figure 2:
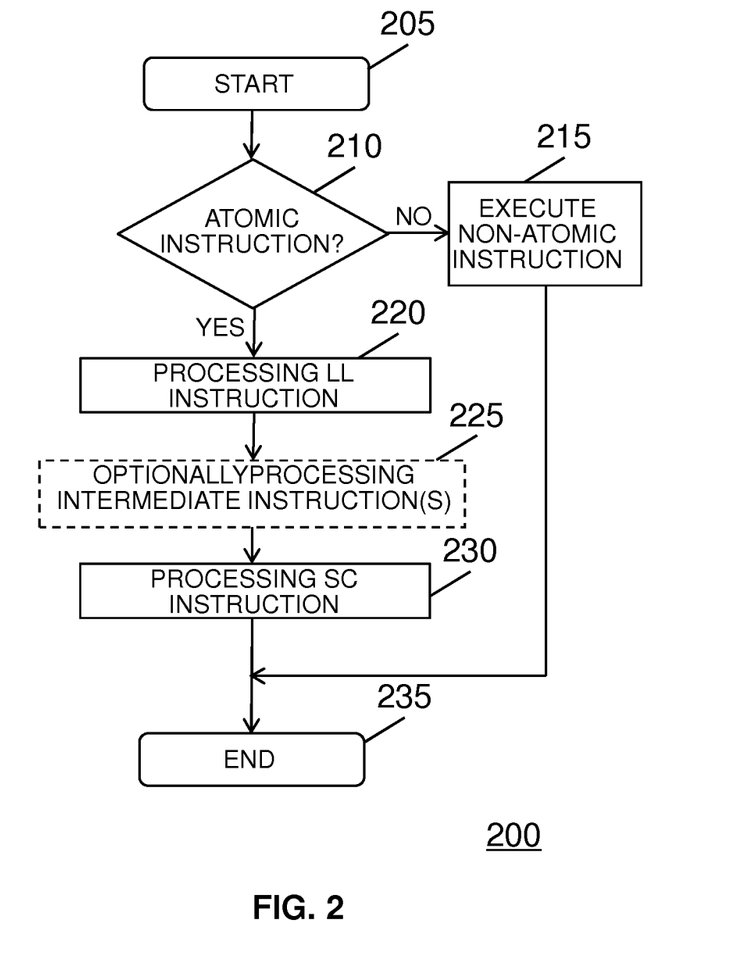
FIG. 2 is a flow chart of a method for performing an atomic operation which is performed by a thread of the system of FIG. 1.

FIG. 2 is a flow chart of a method 200 for performing an atomic operation performed by one of the threads 115, 120, 125 of the multi-thread binary translation system 100. The method 200, at a start block 205, processes an instruction stored in virtual memory address space vM[i] of one of the threads 115,120,125. By way of example only, the method 200 will be described with reference primarily to the thread 115 in which the virtual processor vCPU[1] processes a sequence of instructions in the virtual memory address space vM[1]. At a block 210, the virtual processor vCPU[1] determines if the instruction from the virtual memory address space vM[1] is an atomic instruction. If the instruction is non-atomic then the virtual processor vCPU[1] executes the instruction as a non-atomic instruction at block 215 and then the method 200 terminates at an end block 235. However, if the instruction is an atomic instruction the virtual processor vCPU[1] processes a Load Linked LL instruction at block 220, optionally processes one or more intermediate instructions at block 225 and then processes a Store Conditional SC instruction at a block 230. The method 200 then terminates at the end block 235.

Figure 3:
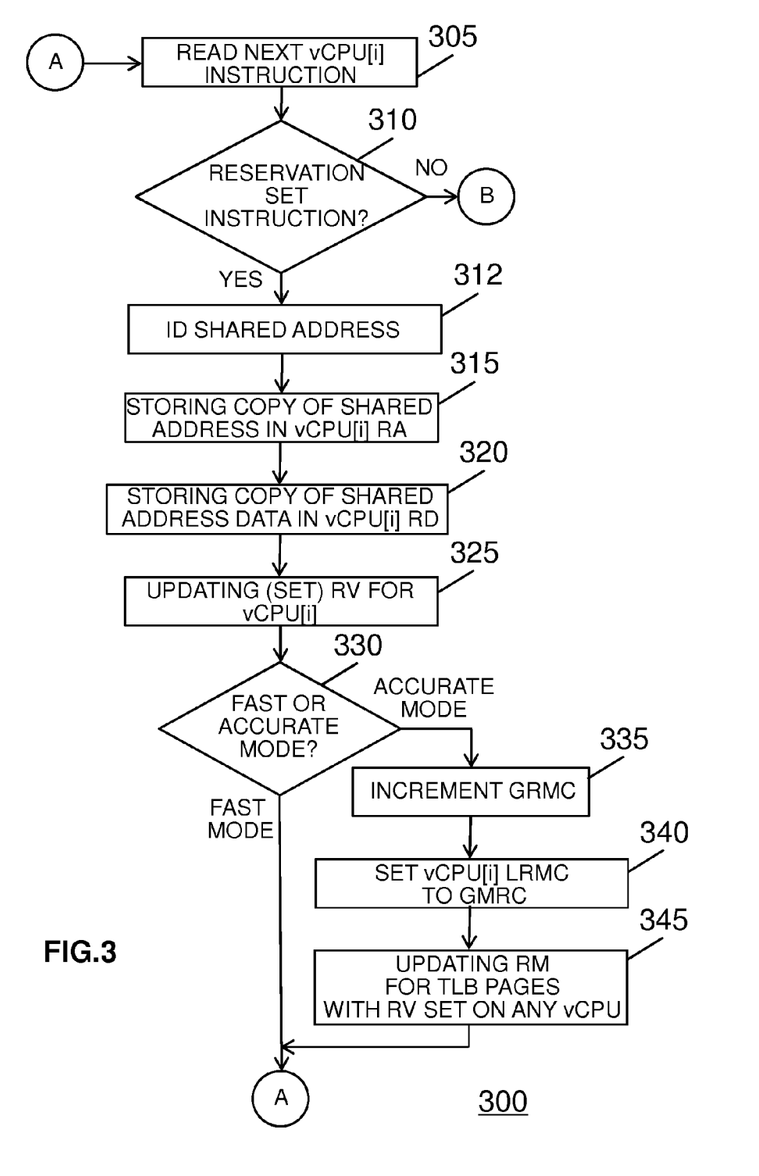
FIG. 3 is a flow chart of a method for processing a load linked instruction stored in virtual memory address space of a thread of the system of FIG. 1 in accordance with an embodiment of the present invention.

Referring to FIG. 3, a flow chart of a method 300 for processing a Load Linked LL instruction (such as that of block 220) stored in the virtual memory address space vM[1] for the thread 115 is shown. In this illustration, it is to be understood that the method 300 is controlled by a sequence of instructions stored in the virtual memory address space vM[1] and processed by the virtual processor vCPU[1]. The method 300 includes, at a reading block 305, a process of reading a next instruction stored in the virtual memory address space vM[1]. The virtual processor vCPU[1] then determines, at a determining block 310, if the instruction is a reservation set (Load Link LL) instruction.

If the instruction is a reservation set instruction, a block 312 then identifies a Load Linked Shared Memory Address LLSMA that is an address of a memory location, in the memory 110, shared by other threads 120, 125 in the system 100. The identification of the load linked shared memory address LLSMA is inherent in the op-code fetch for the instruction as will be apparent to the person skilled in the art.

The method 300, at a storing block 315, then stores a copy of the Load Linked Shared Memory Address LLSMA in a Reservation Address RA in the virtual memory address space vM[1] for the virtual processor vCPU[1]. Next, at a storing block 320, a copy of data COD currently stored in the Load Linked Shared Memory Address address LLSMA is stored in the virtual memory address space vM[1] at an address location designated as a Data Register RD for vCPU[1].

The method 300 then performs an updating process at a block 325 to update a status of a Reservation Valid flag RV, stored VM[1], to indicate that the thread 115 has an atomic reservation. In other words, the updated status of the Reservation Valid flag RV indicates that the virtual memory address space vCPU[1] has a valid reservation for the Reservation Address RA thus indicating that the virtual processor vCPU[1] is actively seeking to obtain a lock or perform some other synchronization operation on the Reservation Address RA.

At a mode test block 330, the method 300 determines if the system 100 has been set to operate in a fast mode or a slower accurate mode. In this embodiment the mode by default is accurate mode, however a user can select the system 100 to operate in fast mode if so required. If at the mode test block 330 it is determined that the system 100 is set to fast mode then the method 300 returns to the reading block 305. However, if the system 100 is set to accurate mode then, at an increment block 335, a Global Reservation Monitoring Counter GRMC is modified to store a count value COUNT indicative of all current atomic operations being performed by the system 100. The Global Reservation Monitoring Counter GRMC is implemented using a host atomic instruction, such as fetch-and-add, and thereby ensures synchronization across multiple threads 115,120,125 of the system 100. Next, at a block 340, a copy of the count value COUNT is stored in a Local Reservation Monitoring Counter LRMC for vCPU[i], stored in the virtual memory address space vM[1], for the thread 115.

Next, at an updating block 345, one or more Reservation Monitoring flags RM are updated (set) to indicate that threads in the system 100 have a Reservation Monitoring flag RM indicative of an atomic reservation. These Reservation Monitoring flags RM are in a Translation Lookaside Buffer (TLB) page list in the virtual memory address space vM[1] for the thread 115. In this regard, only TLB pages that have a Reservation Valid flag RV set to indicate a valid atomic reservation have their Reservation Monitoring Flag RM updated. Thus, a Reservation Monitoring flag RM when set indicates that a virtual processor vCPU[i] in the system 100 is holding a valid reservation for an associated page in the common memory 110. After the updating block 345, the method 300 returns to the reading block 305. If at the determining block 310 it is determined that the instruction is not a reservation set instruction the method performs other operations such as the processing of the Store Conditional SC instruction of block 230.

Figure 4:
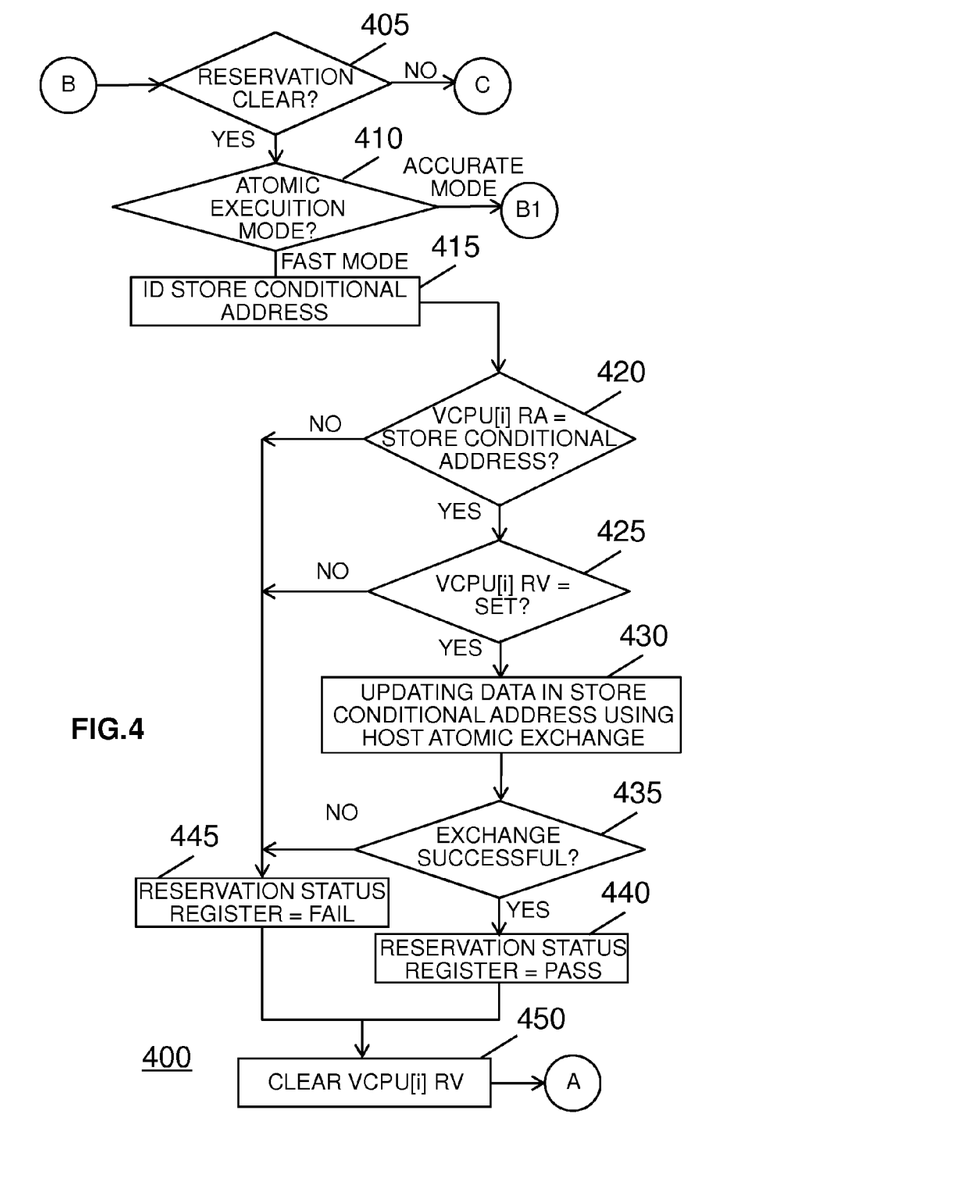
FIG. 4 is a flow chart of a method for processing a fast mode Store Conditional instruction stored in the virtual memory address space of a thread of the system of FIG. 1 in accordance with an embodiment of the present invention.

Referring to FIG. 4, a flow chart of a method 400 for processing a fast mode Store Conditional SC instruction (such as that of block 230) stored in the virtual memory address space vM[1] for the thread 125 is shown. As above, it is to be understood that the method 400 is controlled by a sequence of instructions stored in the virtual memory address space vM[1] and processed by the virtual processor vCPU[1]. In this embodiment, the method 400 is executed after the determining block 310 determines that the instruction read at the reading block 305 is not a load linked LL instruction. At a determining block 405, the method 400 determines if the instruction, read at the reading block 305, is a reservation clear (Store Conditional SC) instruction. If the instruction is a Store Conditional SC instruction a mode test block 410 then determines if the system 100 has been set to operate in the fast mode or the slower accurate mode. If it is determined that the system 100 is set to fast mode then, at a block 415, the store conditional instruction SC identifies a store conditional shared memory address (which is inherent in the op-code fetch for the instruction).

The method 400 then determines if the following three conditions are satisfied:

Condition 1, which is reviewed at a test block 420 where it is determined if the copy of the Load Linked Shared Memory Address LLSMA associated with the virtual processor vCPU[1] and stored in the Reservation Address RA in the virtual memory address space vM[1], is the same as the store conditional shared memory address;

Condition 2, which is reviewed at a test block 425 where it is determined if the Reservation Valid flag RV in the virtual memory address space vM[1] associated with the virtual processor vCPU[1], indicates that the thread 115 has a valid reservation; and Condition 3, which is reviewed at an atomic exchange block 430 where it is determined if the copy of data COD in the data register RD for the virtual processor vCPU[1], is the same as data currently stored in the store conditional shared memory address.

As will be apparent to a person skilled in the art, condition 3 determined by a compare exchange atomic instruction that is performed by the multi-core host processor's 105 atomic instruction protocol. This therefore guarantees atomicity across different threads 115,120,125 as will be apparent to a person skilled in the art. If the above three conditions are satisfied the method 400 updates the data stored in the store conditional shared memory address with data generated by the thread 115. The method 400 then, at a test block 435 determines if the atomic exchange of block 430 was successful. If successful a Reservation Status Register RSR is updated to indicate a successful atomic exchange at block 440. However, if any of the conditions 1 to 3 are not satisfied the Reservation Status Register RSR is updated to indicate an unsuccessful atomic exchange at block 445.

After either block 440 or 445 has updated the Reservation Status Register RSR, the Reservation Valid flag RV for the virtual processor vCPU[1] is updated at a block 450, the updating of the Reservation Valid flag RV indicates that the thread 115 (VCPU[1]) no longer has a valid atomic reservation. After block 450 the method 400 returns to the reading block 305. However, if at the determining block it is determined that the instruction is not a reservation clear instruction the method performs a non-atomic operation such as that of block 215. Also, if it is determined that the system 100 is set to accurate mode at a block 410 then the instruction is executed as an accurate mode Store Conditional SC instruction as described below.

Figure 5:
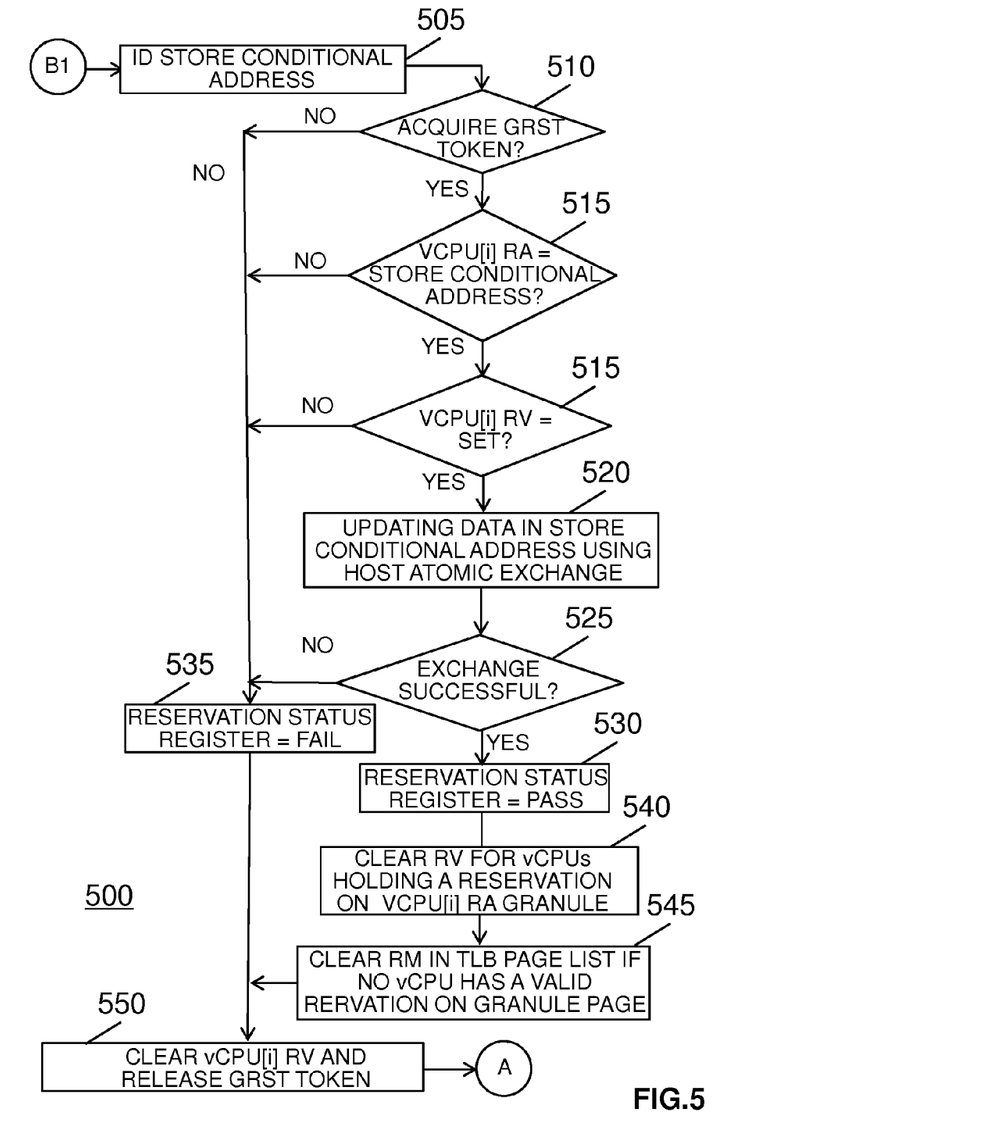
FIG. 5 is a flow chart of a method for processing an accurate mode Store Conditional instruction stored in the virtual memory address space of a thread of the system of FIG. 1 in accordance with an embodiment of the present invention.

In FIG. 5, a flow chart of another embodiment of a method 500 for processing an accurate mode Store Conditional SC instruction (such as that of block 230) stored in the virtual memory address space vM[1] for the thread 125 is shown. As above, it is to be understood that the method 500 is controlled by a sequence of instructions stored in the virtual memory address space vM[1] and processed by the virtual processor vCPU[1]. The method 500 is performed when it is determined that the system 100 is set to accurate mode as determined at the test mode block 410. At a block 505 the Store Conditional instruction SC identifies a store conditional shared memory address which is inherent in the op-code fetch for the instruction. Then in addition to conditions 1 to 3, as described above, a further condition is determined. This further condition is:

Condition 4 which is reviewed at an acquisition test block 510 where it is determined if there is a successful acquisition by the thread 115 (vCPU[i]) of a Global Reservation Token GRST that is acquirable by any thread 115, 120, 125 in the system 100.

During the processing of the acquisition test block 510, the acquisition of the Global Reservation Token GRST is inherently attempted. If a successful acquisition of the Global Reservation Token GRST then whilst the GRST is acquired by the thread 115 (vCPU[1]), any other thread's attempt to perform a store conditional is marked as failed by the system 100. If all Conditions 1 to 4 are all satisfied by the processing of blocks 510 to 520 the method 500 updates the data stored in the store conditional shared memory address with data generated by the thread 115. The method 500 then, at a test block 525 determines if the atomic exchange of block 520 was successful. If successful the Reservation Status Register RSR is updated to indicate a successful atomic exchange at block 530. However, if any of the conditions 1 to 4 are not satisfied the Reservation Status Register RSR is updated to indicate an unsuccessful atomic exchange at block 535. After block 535 the Reservation Valid flag RV for the virtual processor vCPU[1] is updated at a block 550 and if the Global Reservation Token GRST has been acquired by the tread 115 (vCPU[1]) it is released. A previously mentioned, the updating of the Reservation Valid flag RV indicates that the thread 115 (VCPU[1]) no longer has the atomic reservation.

If the Reservation Status Register RSR is updated at block 530, then selected Reservation Valid flags RV for all threads 115, 120, 125 that are set to indicate a valid reservation are cleared (reset). The selected Reservation Valid flags RV (if any) are determined to be any Reservation Valid flag RV, set to indicate a valid reservation and is within a granule of the Load Linked Shared Memory Address LLSMA stored in the Reservation Address RA for the virtual processor vCPU[1]. This resetting of the selected Reservation Valid flags RV is performed at a block 540. In summary, block 540 performs the selectively updating Reservation Valid flags RV in the system 100 that are indicative of an atomic reservation and are within a granule of the store conditional shared memory address which is the same as the Load Linked Shared Memory Address LLSMA. The selectively updating changes a status of the Reservation Valid flags RV so that they are indicative of current atomic reservation for their respective threads or vCPUs.

Next, at a block 545, the method 500 performs a process of selectively updating the Reservation Monitoring flag RM to indicate that an atomic reservation is not present on a memory page that includes the granule of the load linked shared memory address LLSMA stored in the Reservation Address RA. Block 550 then updates the Reservation Valid flag RV for the virtual processor vCPU[1] releases the Global Reservation Token GRST and once released the global token GRST is acquirable by any thread in the system 100. After block 550, the method 500 returns to the reading block 305.

In summary, the Global Reservation Token GRST causes Store Conditional operation serialization across all simulator threads 115, 120, 125. Its main purpose is to ensure that in case of multiple contending Load Linked or Store Conditional atomic instructions, from different threads, only one Store Conditional simulator thread will succeed. The Global Reservation Token GRST token acquisition is done in a wait-free manner, and even if the Global Reservation Token GRST is unavailable, the thread will make forward progress. This includes marking its atomic operation as failed and will allow the thread software to decide the next step such as re-attempt lock acquisition or perform other operations.

Figure 6:
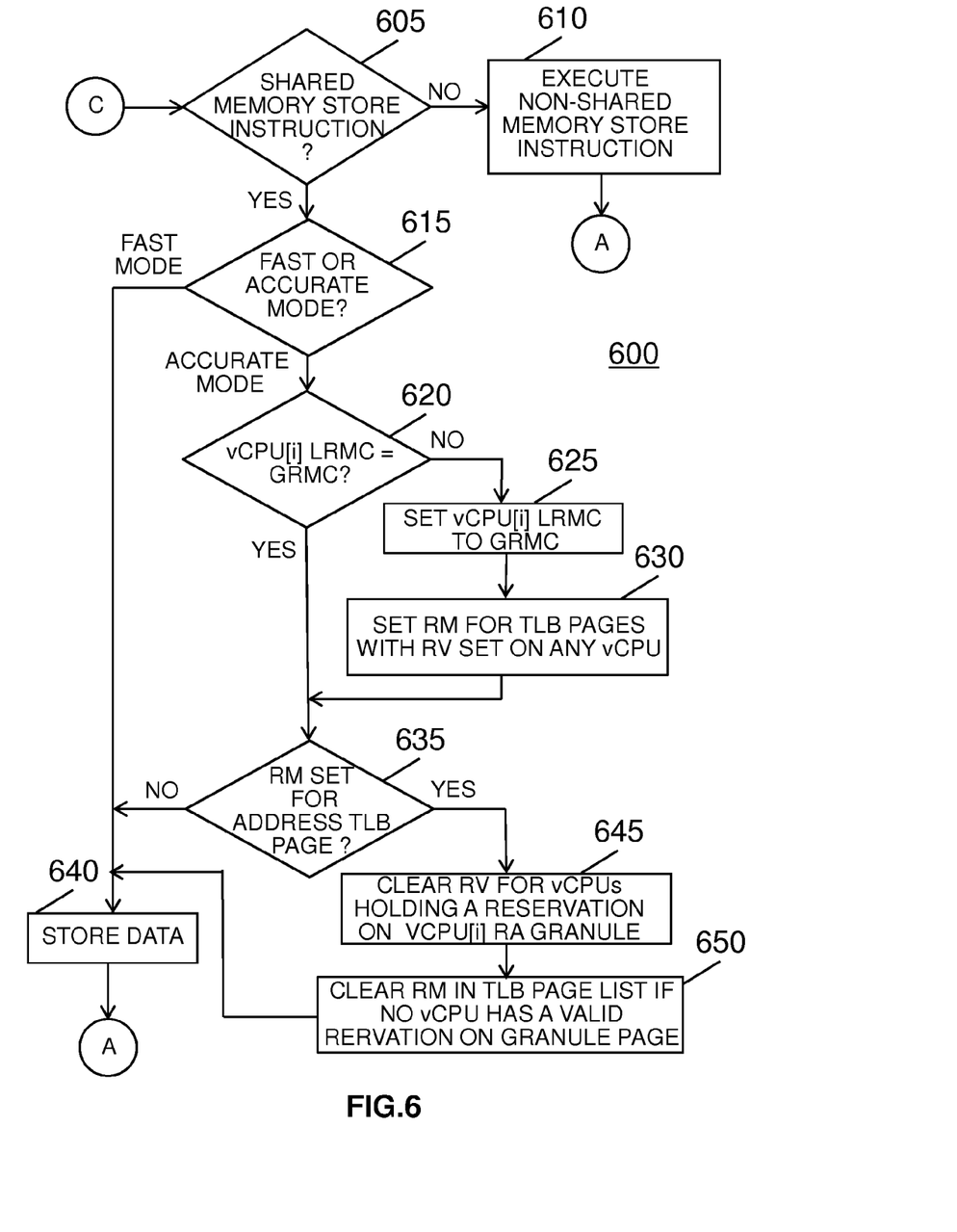
FIG. 6 is a flow chart illustrating a method of processing a non-atomic instruction stored in the virtual memory address space of a thread of the system of FIG. 1 in accordance with an embodiment of the present invention.

Referring to FIG. 6, a flow chart illustrating a method 600 of processing of an non-atomic instruction (such as that of of block 215) stored in the virtual memory address space vM[1] for the thread 125 is shown. As above, it is to be understood that the method 600 is controlled by a sequence of instructions stored in the virtual memory address space vM[1] and processed by the virtual processor vCPU[1]. In this embodiment, the method 600 is executed after the determining block 405 determines that the instruction read at the reading block 305 is not a Store Conditional SC instruction and thus must be non-atomic. However, the method 600 can also be performed concurrently by other threads in the system, or before an non-atomic operation, as will be apparent to a person skilled in the art.

At a determining block 605, the method 600 determines if the instruction, read at the reading block 305, is a non-shared memory store instruction (e.g., any store instruction that that does not share a memory address store location). If the instruction is a non-shared memory store instruction then the instruction is executed at a block 610 and the method 600 is thereafter completed and the vCPU[1] reads the next instruction at block 305. However, if the instruction is a shared memory store instruction the method 600, at a mode test block 615, determines if the system 100 has been set to operate in the fast mode or the slower accurate mode. If fast mode is selected then at a block 640 data identified by the instruction is stored in the shared memory address of the system 100 (memory 110). The method 600 is then complete and the virtual processor vCPU[1] reads the next instruction at block 305. However, if accurate mode is selected a test block 620 determines if there is a counter match (count value COUNT match) between the Global Reservation Monitoring Counter GRMC and the Local Reservation Monitoring Counter LRMC for the thread 115 (vCPU[1]). If the test block 620 determines that a match is absent, a block 625 stores an updated copy of the count value COUNT of the Global Reservation Monitoring Counter GRMC in the local reservation monitoring counter LRMC for the thread 115 (vCPU[i]).

A block 630 then updates the Reservation Monitoring flags RM to indicate which threads in the system have a Reservation Valid flag RV indicative of an atomic reservation. Thus, the Reservation Monitoring flags RM are updated to indicate which threads in the system have a reservation valid flag RV indicative of an atomic reservation.

Directly after either block 620 or 630, a test block 635 determines if a memory page for the shared memory indicates that an atomic reservation is not present. If the atomic reservation is not present there is performed, at the block 640, a storing of the data in the shared memory address of the system 100 (memory 110). However, when the atomic reservation is present there is performed a process of updating the Reservation Valid flags RV, at a block 645, to indicate that an atomic reservation is not present on the memory page. Thereafter, at a block 650, there is performed a process of updating the Reservation Monitoring flag to indicate that an atomic reservation is not present on the memory page. Then the storing data in a shared memory address of the system 100 (memory 110) is performed.

The method 600 when in fast mode operation, the data store is execute in an unmodified manner. In contrast, when in accurate mode operation, the goal is to clear the Reservation Valid flags RV of all vCPUs that have a valid reservation on the same coherency granule as the shared memory address. To optimize this process and minimize the extra check overheads (for most store instructions), a core Instruction Set Simulation TLB array data structure has a Reservation Monitor flag RM per entry. Pages whose TLB entry's RM flag is clear (implying no active reservations on this page in the system), proceed the fastest in the same manner similar to fast mode. However, pages that have a Reservation Monitor flag RM set for their TLB entry are required to clear all vCPUs that have RV flags set and their RA values are in coherency granule of the store instruction address. Store instructions also are responsible to set the RM for TLB entries where any vCPU has a valid reservation falling into that page. In order to minimize this overhead, store only sets RM flags if LRMC and GRMC are not equal i.e., if a new reservation address is active since the last store execution. Further, the store instruction execution also clears the RM on its TLB page if there are no active reservations anymore on this page. As will be apparent to a person skilled in the art, the method 600 has the potential to speed up execution of subsequent stores on the page in question.

Advantageously, the present invention provides for a store instruction execution flow that is non-blocking and wait-free. Also, the Reservation Valid flag RV is set by a Load Link process and is potentially cleared by Store instructions without necessarily requiring serialization.

The description of the preferred embodiments of the present invention has been presented for purposes of illustration and description, but is not intended to be exhaustive or to limit the invention to the forms disclosed. It will be appreciated by those skilled in the art that changes could be made to the embodiments described above without departing from the broad inventive concept thereof. It is understood, therefore, that this invention is not limited to the particular embodiment disclosed, but covers modifications within the spirit and scope of the present invention as defined by the appended claims.

The invention claimed is:

1. A method for performing an atomic operation by a thread in a multi-thread binary translation system comprising a multi core host processor, the method comprising:
   processing a load linked instruction stored in a virtual memory address space for the thread, wherein load linked instruction identifies a load linked shared memory address that is an address of a memory location shared by other threads in the system, and wherein the processing a load linked instruction includes storing a copy of the load linked shared memory address, storing a copy of data currently stored in the load linked shared memory address, and updating the status of a reservation flag to indicate that the thread has an atomic reservation; and
   processing a store conditional instruction stored in the virtual memory address space for the thread, wherein the store conditional instruction identifies a store conditional shared memory address, and wherein the processing a store conditional instruction includes updating data stored in the store conditional shared memory address with data generated by the thread, the updating being performed only when at least three conditions are satisfied, the conditions being:
      the copy of the load linked shared memory address is the same as the store conditional shared memory address,
      the reservation flag indicates that the thread has a valid reservation,
      and the copy of data is the same as data stored in the store conditional shared memory address.

2. The method of claim 1, wherein the processing the load linked instruction further includes modifying a global reservation monitoring counter to store a count value indicative of all current atomic operations being performed by the system and storing a copy of the count value in a local reservation monitoring counter for the thread.

3. The method of claim 2, wherein the processing the load linked instruction further includes updating reservation monitoring flags to indicate that threads in the system have a reservation monitoring flag indicative of an atomic reservation, wherein the reservation monitoring flags are in a TLB page list in the virtual memory address space for the thread.

4. The method of claim 1, wherein after the updating data has been performed the reservation flag is updated to indicate that the thread no longer has the atomic reservation.

5. The method of claim 2, wherein the updating data is performed only when a further condition is also satisfied, the further condition being: a successful acquisition by the tread of a global token acquirable by any thread in the system.

6. The method of claim 5, wherein while the token is acquired by the thread any other thread's attempt to perform a store conditional is marked as failed by the system.

7. The method of claim 6, wherein the processing the store conditional instruction further includes selectively updating reservation flags in the system that are indicative of an atomic reservation and are within a granule of the store conditional shared memory address, wherein the selectively updating changes a status of the selected reservation flags so that they are indicative of current atomic reservation for their respective threads.

8. The method of claim 7, wherein the processing the store conditional instruction further includes selectively updating a reservation monitoring flag to indicate that an atomic reservation is not present on a memory page that includes the granule.

9. The method of claim 8, wherein the global token is released after the updating data has been performed, and once released the global token is acquirable by any thread in the system.

10. The method of claim 1, wherein the condition of the copy of data being the same as data stored in the load linked shared memory address is determined by a compare exchange atomic instruction of the core host processor.

11. The method of claim 9, further including processing a non-atomic instruction, the non-atomic instruction being processed after the processing of the store conditional instruction, wherein the non-atomic instruction includes storing data in a shared memory address of the system.

12. The method of claim 9, further including processing a non-atomic instruction, the non-atomic instruction being processed after the processing of the store conditional instruction, wherein the processing a non-atomic instruction includes identifying a counter match when the count value in the global reservation monitoring counter is the same as the copy of the count value stored in the local reservation monitoring counter for the thread, and when the match is absent there is performed a process of updating the reservation monitoring flags to indicate which threads in the system have a reservation flag indicative of an atomic reservation.

13. The method of claim 12, wherein when the match is absent there is performed a process of storing an updated copy of the count value in the local reservation monitoring counter for the thread.

14. The method of claim 13, further including determining if the Reservation Monitoring flag, for a memory page for the shared memory indicates that an atomic reservation is not present, and when the atomic reservation is not present there is performed a storing of data in a shared memory address of the system.

15. The method of claim 14, wherein when the atomic reservation is present there is performed a process of updating the reservation flags to indicate that an atomic reservation is not present on the memory page.

16. The method of claim 15, wherein when the atomic reservation is present there is performed a process of updating the reservation monitoring flag to indicate that an atomic reservation is not present on the memory page and then storing data in a shared memory address of the system.

17. A multi-thread binary translation system comprising a multi-core host processor with a host memory, wherein the processor in operation provides for concurrently controlling multi-threads where two or more of the threads concurrently perform the operations of:
processing a load linked instruction stored in a virtual memory address space for the thread, wherein load linked instruction identifies a load linked shared memory address of the host memory that is an address of a memory location shared by other threads in the system, and wherein the processing a load linked instruction includes storing a copy of the load linked shared memory address, storing a copy of data currently stored in the load linked shared memory address, and updating the status of a reservation flag to indicate that the thread has an atomic reservation; and
processing a store conditional instruction stored in the virtual memory address space for the thread, wherein the store conditional instruction identifies a store conditional shared memory address, and wherein the processing a store conditional instruction includes updating data stored in the store conditional shared memory address with data generated by the thread, the updating being performed only when at least three conditions are satisfied, the conditions being:
the copy of the load linked shared memory address is the same as the store conditional shared memory address, and the reservation flag indicates that the thread has a valid reservation,
and the copy of data is the same as data stored in the store conditional shared memory address.

18. The multi-thread binary translation system of claim 17, wherein in operation the processing the load linked instruction further includes modifying a global reservation monitoring counter to store a count value indicative of all current atomic operations being performed by the system.

19. The multi-thread binary translation system of claim 18, wherein the processing the load linked instruction further includes updating reservation monitoring flags to indicate which threads in the system that have a reservation flag indicative of an atomic reservation, wherein the reservation monitoring flags are in a TLB page list in the virtual memory address space.

20. The multi-thread binary translation system of claim 19, wherein after the updating data has been performed the reservation flag is updated to indicate that the thread no longer has the atomic reservation.

\* \* \* \* \*